United States Patent [19]
Penny et al.

[11] 3,824,036
[45] July 16, 1974

[54] GAS TURBINE ROTORS

[75] Inventors: Robert Noel Penny, Solihull; Peter Harry Parker, Redditch; Calvin Eric Silverstone, Oversley Green, all of England

[73] Assignee: British Leyland Truck and Bus Division Limited, Leyland, England

[22] Filed: Jan. 12, 1972

[21] Appl. No.: 217,205

[30] Foreign Application Priority Data
Feb. 15, 1971 Great Britain.................... 4657/71

[52] U.S. Cl.................................. 416/95, 416/244
[51] Int. Cl............................................. F01d 5/08
[58] Field of Search........................ 416/244, 95, 231

[56] References Cited
UNITED STATES PATENTS

| | | | |
|---|---|---|---|
| 874,398 | 12/1907 | DeFerranti | 416/95 UX |
| 2,665,881 | 1/1954 | Smith et al. | 416/231 X |
| 2,807,434 | 9/1957 | Zimmerman | 416/95 |
| 3,255,994 | 6/1966 | Dreimanis | 416/244 |
| 3,262,674 | 7/1966 | Huebner et al. | 416/244 |
| 3,262,675 | 7/1966 | Huebner et al. | 416/244 |
| 3,262,676 | 7/1966 | Huebner et al. | 416/244 |
| 3,291,446 | 12/1966 | Huebner | 416/244 X |
| 3,664,766 | 5/1972 | Rahnke | 416/244 |
| 3,730,644 | 5/1973 | Jubb | 416/95 |

FOREIGN PATENTS OR APPLICATIONS 1,017,511  9/1952  France.................................. 416/95

*Primary Examiner*—Everette A. Powell, Jr.
*Attorney, Agent, or Firm*—Brisebois & Kruger

[57] ABSTRACT

An integrally cast gas turbine rotor, with a continuous rim existing at the roots of its blades, is characterized by having the blades rooted also to a second continuous rim situated at a smaller radius, such that this inner rim is subject to temperatures (and hence thermal stresses) significantly lower than those experienced by the existing outer rim.

4 Claims, 5 Drawing Figures

GAS TURBINE ROTORS

This invention relates to improvements in the design of gas turbine rotors, especially those pertaining to so-called automotive gas turbine engines (i.e., small enough to serve as power units for automotive vehicles).

Turbine rotors for automotive gas turbine engines are usually produced complete from integral castings, because the smallness of such rotors creates difficulties in securing separate blades to the hub.

The continuous rim at the roots of the blades of such an integrally cast rotor is subject to high thermal stresses in addition to the hoop stresses, and is prone to cracking in service.

According to this invention an integrally cast gas turbine rotor, with a continuous rim existing at the roots of its blades, is characterized by having the blades rooted also to a second continuous rim situated at a smaller radius, such that this inner rim is subject to temperatures (and hence thermal stresses) significantly lower than those experienced by the existing outer rim.

Referring to the accompanying drawings.

Figure 1:
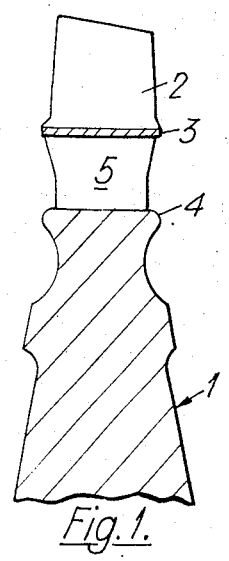
FIG. 1 is a fragmentary sectional view of an integrally cast gas turbine rotor in accordance with the invention.
Figure 2:
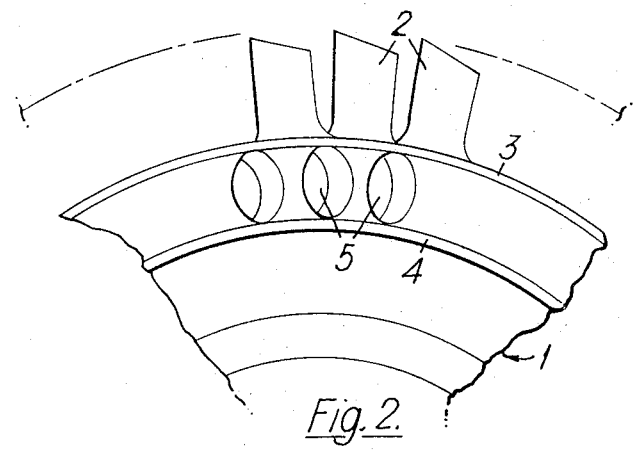
FIG. 2 is a fragmentary end elevation of the rotor.
Figure 3:
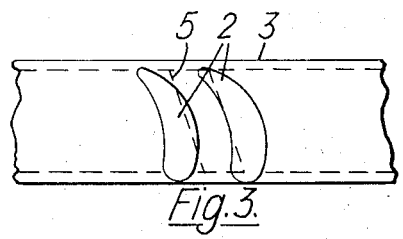
FIG. 3 is a fragmentary plan view.
Figure 4:
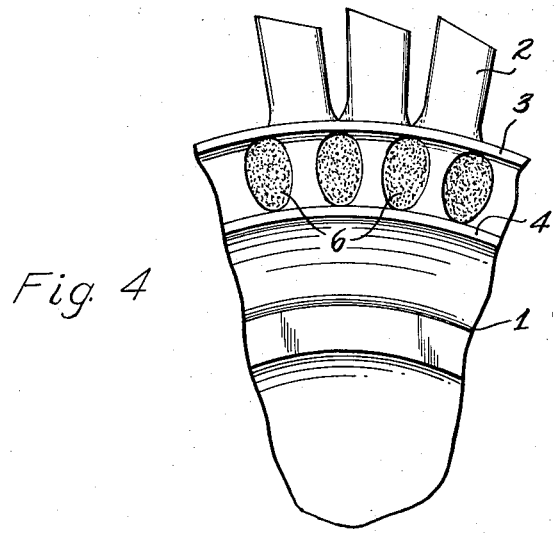
FIG. 4 is a fragmentary end elevation of a rotor in which the holes are obturated by air permeable metal plugs.
Figure 5:
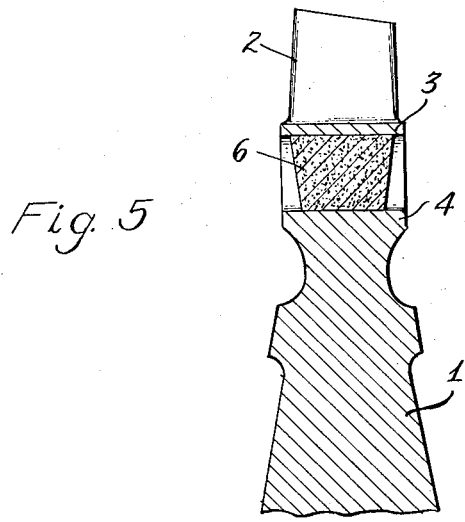
FIG. 5 is a fragmentary sectional view taken along the line V—V of FIG. 4.

An integrally cast gas turbine rotor, comprising a hub 1 and blades 2, has a continuous rim 3 existing at the roots of its blades. In accordance with the invention the profile of the hub 1 of the rotor is redesigned to produce a second continuous rim 4 at a radius which is approximately two-thirds of the blade height less than the radius of the existing outer rim 3. Elongated holes 5, equal in number to the blades 2, are machined through the hub 1 at a pitch circle radius which is the mean between the radii of the two rims 3 and 4. The holes 5 are situated between the roots of adjacent blades 2, and are machined at an angle (see FIG. 3) to the axial direction such that they are approximately parallel to the mean camber line of the blades, thus effectively extending the blades to a smaller root diameter. In service the outer rim 3 is expected to crack between the blades 2, but it still defines the inner boundary of the gas path through the gaps between the blades and acts as a snubber to reduce blade vibration.

The holes 5 must be subsequently obturated to prevent undue leakage of gas from the high-pressure to the low-pressure side of the rotor disc, and to reduce windage losses. This can be done in a variety of ways. Spring discs ('Welsh washers') can be fitted into recesses around the holes 5 on either side of the rotor disc; annular spring rings can be brazed into position on either side of the rotor disc; or, and this is the preferred method, the holes 5 can be obturated by brazing into them low-density, high-temperature air-permeable metal plugs 6.

The metal plugs referred to may be a foamed structure such as 'Retimet' produced by the Dunlop Company Limited, or Hiver Nickel Felt marketed by Heurtey Limited. The plugs have a density of less than 0.54 g/cc., with a controlled permeability which will permit the required flow of the disc-cooling air to pass through them.

We claim:

1. An integrally cast turbine rotor having a continuous outer rim supporting the roots of a plurality of blades, and a coaxial annular axially thickened portion having a radius smaller than that of said rim, said rotor defining a plurality of holes between said rim and annular thickened portion, said holes being equal in number to said blades and each hole being positioned between the roots of two adjacent blades, said holes being obturated by low-density, high-temperature, air-permeable metal plugs having a sufficient resistance to air flow therethrough to maintain a pressure differential between the two sides of the rotor during normal use.

2. An integrally cast gas turbine rotor according to claim 1 in which the radius of said annular thickened portion is approximately two-thirds of the blade height less than the radius of the continuous outer rim.

3. An integrally cast turbine rotor according to claim 1 in which said holes are centered on a pitch circle having a radius which is the mean between the radius of said rim and that of said annular thickened portion and are approximately parallel to the mean camber line of the blades.

4. An integrally cast turbine rotor as claimed in claim 1 in which said plugs have a density of less than 0.54 g/cc and a permeability which permits the flow of cooling air therethrough, said holes are radially elongated, and said plugs are brazed into said holes.

* * * * *